(12) United States Patent
Fujita (10) Patent No.: US 10,746,992 B2
(45) Date of Patent: *Aug. 18, 2020

(54) PROJECTION DISPLAY DEVICE WITH LIGHT BLOCKING REGION DETECTION, AND CONTROL METHOD AND CONTROL PROGRAM FOR PROJECTION DISPLAY DEVICE WITH LIGHT BLOCKING REGION DETECTION

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,667

(22) Filed: May 21, 2019

(65) Prior Publication Data

US 2019/0271842 A1 Sep. 5, 2019

Related U.S. Application Data

(63) Continuation of application No. PCT/JP2017/036057, filed on Oct. 4, 2017.

(30) Foreign Application Priority Data

Dec. 12, 2016 (JP) .................................. 2016-240497

(51) Int. Cl.
*G02B 27/01* (2006.01)
*B60K 35/00* (2006.01)

(52) U.S. Cl.
CPC ......... *G02B 27/0101* (2013.01); *G02B 27/01* (2013.01); *B60K 35/00* (2013.01);
(Continued)

(58) Field of Classification Search
CPC ................ G02B 27/0101; G02B 27/01; B60K 2370/1529

See application file for complete search history.

(56) References Cited

U.S. PATENT DOCUMENTS

2006/0100774 A1* 5/2006 Barkowski ........... G01C 21/365
701/532
2008/0049331 A1* 2/2008 Nakamura ......... G02B 27/0101
359/630

(Continued)

FOREIGN PATENT DOCUMENTS

DE 102005025572 6/2006
JP S63156833 10/1988

(Continued)

OTHER PUBLICATIONS

"International Search Report (Form PCT/ISA/210) of PCT/JP2017/036057," dated Dec. 19, 2017, with English translation thereof, pp. 1-6.

(Continued)

*Primary Examiner* — Chun-Nan Lin
(74) *Attorney, Agent, or Firm* — JCIPRNET (57) ABSTRACT

A HUD including a projection display unit, a housing, a cover, a region detecting unit, and a display control unit is provided. The projection display unit includes a light modulating unit spatially modulating light emitted from a light source based on input image information and projects modulated image light onto a windshield of an automobile to display an image. The housing accommodates the projection display unit and has an opening portion through which the modulated image light exits. The cover covers the opening portion. The region detecting unit detects an object adhesion region in which an object is adhered to the cover. The display control unit controls the image information to be input to the light modulating unit to control the image to be (Continued)

100 HUD
1 Automobile
2 Windshield
3 Housing
4 Dashboard
5 Control unit
6 Diffusion member
7 Concave mirror
8 Connecting unit
9 Cover
10 Image capturing unit
K Opening portion
E Eye displayed by the projection display unit. The display control unit causes the projection display unit to display an outline of the object adhesion region.

9 Claims, 9 Drawing Sheets

(52) U.S. Cl.
CPC .. *B60K 2370/1529* (2019.05); *B60K 2370/21* (2019.05); *G02B 2027/0138* (2013.01); *G02B 2027/0141* (2013.01)

(56) References Cited

U.S. PATENT DOCUMENTS

2012/0268582 A1* 10/2012 Rothenhausler ...... B60S 1/0844
                                                          348/78
2013/0343053 A1* 12/2013 Holman ................ G03B 21/00
                                                          362/241

FOREIGN PATENT DOCUMENTS

| JP | 2003237411 | 8/2003 |
| JP | 2005075230 | 3/2005 |
| JP | 2008040091 | 2/2008 |
| JP | 2010033222 | 2/2010 |
| JP | 2012026857 | 2/2012 |
| JP | 2013511431 | 4/2013 |
| JP | 2016058912 | 4/2016 |

OTHER PUBLICATIONS

"Written Opinion of the International Searching Authority (Form PCT/ISA/237) of PCT/JP2017/036057," dated Dec. 19, 2017, with English translation thereof, pp. 1-9.

* cited by examiner

FIG. 1

| | |
|---|---|
| 100 | HUD |
| 1 | Automobile |
| 2 | Windshield |
| 3 | Housing |
| 4 | Dashboard |
| 5 | Control unit |
| 6 | Diffusion member |
| 7 | Concave mirror |
| 8 | Connecting unit |
| 9 | Cover |
| 10 | Image capturing unit |
| K | Opening portion |
| E | Eye |

| 4 | Dashboard |
| 9 | Cover |
| 20 | Display area |
| 20a, 20b, 20c | Images |
| 90 | Light exit area |
| X | X-direction |
| Y | Y-direction |

FIG. 6

| 4 | Dashboard |
|---|---|
| 9 | Cover |
| 20 | Display area |
| 20a, 20b | Images |
| 90 | Light exit area |
| 91 | Object adhesion region |
| X | X-direction |
| Y | Y-direction |

FIG. 7

| 4 | Dashboard |
| 9 | Cover |
| 20 | Display Area |
| 21 | Outline |
| 90 | Light exit area |
| 91 | Object adhesion region |
| 91a | Missing region |
| X | X-direction |
| Y | Y-direction |

FIG. 8

| 4 | Dashboard |
| 9 | Cover |
| 20 | Display Area |
| 21 | Outline |
| 22 | Frame |
| 90 | Light exit area |
| 91 | Object adhesion region |
| 91a | Missing region |
| X | X-direction |
| Y | Y-direction |

FIG. 9

| | |
|---|---|
| 4 | Dashboard |
| 9 | Cover |
| 20 | Display area |
| 23 | Image |
| 90 | Light exit area |
| 91 | Object adhesion region |
| 91a | Missing region |
| X | X-direction |
| Y | Y-direction |

FIG. 10

PROJECTION DISPLAY DEVICE WITH LIGHT BLOCKING REGION DETECTION, AND CONTROL METHOD AND CONTROL PROGRAM FOR PROJECTION DISPLAY DEVICE WITH LIGHT BLOCKING REGION DETECTION

CROSS-REFERENCE TO RELATED APPLICATIONS

This application is a Continuation of PCT International Application No. PCT/JP2017/036057 filed on Oct. 4, 2017, which claims priority under 35 U.S.C § 119(a) to Japanese Patent Application No. 2016-240497 filed on Dec. 12, 2016. Each of the above application(s) is hereby expressly incorporated by reference, in its entirety, into the present application.

BACKGROUND OF THE INVENTION

1. Field of the Invention

The present invention relates to a projection display device, a control method for a projection display device, and a non-transitory computer readable recording medium storing a control program for a projection display device.

2. Description of the Related Art

An HUD (head-up display) for vehicles is known that uses the windshield of a vehicle, such as an automobile, a train, a ship, a heavy machine, a construction machine, an aircraft, or an agricultural machine, or a combiner disposed near the windshield as a screen and projects light onto the screen to display images. Such an HUD can be used to allow an image based on light projected from the HUD to be visible to the driver as a real image on the screen or a virtual image ahead of the screen.

JP2003-237411A discloses a vehicle-mounted HUD in which an openable/closable shutter unit is provided for an opening portion of a housing through which image light that is projected onto a screen passes, and the shutter unit closes while the HUD is not used to thereby prevent a foreign object, direct sunlight, etc. from entering the inside of the opening portion.

JP2008-040091A discloses a vehicle-mounted HUD in which a transparent cover is provided for an opening portion of a housing in order to prevent a foreign object from entering the inside of a device.

JP2016-058912A discloses not an HUD but a system that analyses a captured image and detects that image capturing is not possible partially due to waste adhered to the lens of a vehicle-mounted camera to notify the user of the location of a region for which image capturing is not possible.

SUMMARY OF THE INVENTION

In an HUD for vehicles, an exit surface through which image light exits is exposed in the space inside a vehicle, and therefore, may become dirty when the user touches the exit surface or when a water droplet, waste, etc. is adhered to the exit surface. Specifically, in a case of a construction machine or a heavy machine, it is highly likely that the exit surface becomes dirty.

When dirt is adhered to the exit surface of an HUD, image light is partially blocked by the dirt, and displayed information is partially missing. In an HUD, it is often the case that information is not always displayed across an entire display area but only necessary information is displayed when needed. Therefore, even if information is missing, it is difficult for the user to be aware of missing of information. Specifically, in a case where the exit surface becomes larger, it is difficult to know a portion of the display area in which information is missing.

In order to prevent missing of information due to dirt, the user needs to frequently clean the exit surface. However, when the exit surface becomes large, cleaning of the exit surface is not easy. When the user cleans the exit surface at random without knowing the location of a dirty portion, the dirty portion might not be cleaned, and missing of information might not be prevented.

The HUDs described in JP2003-237411A and JP2008-040091A do not take into consideration how to handle a case where dirt is adhered to the exit surface.

JP2016-058912A discloses a technique for visualizing a region for which image capturing by an image capturing device is not possible and does not disclose a technique used in a case where information is missing in an HUD that serves as a display device.

The present invention has been made in view of the above circumstances, and an object thereof is to provide a projection display device, a control method for a projection display device, and a non-transitory computer readable recording medium storing a control program for a projection display device with which a region in which information is missing can be visualized to facilitate cleaning.

A projection display device according to the present invention includes: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; a region detecting unit that detects an object adhesion region in which an object is adhered to the cover; and a display control unit that controls the image information to be input to the light modulating unit to control the image to be displayed by the projection display unit, in which the display control unit causes the projection display unit to display an outline of a region, in a display area in which the image is displayable by the projection display unit, in which the image light is blocked due to the object adhesion region.

A control method for a projection display device according to the present invention is control method for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; and a cover that covers the opening portion, the control method including: a region detecting step of detecting an object adhesion region in which an object is adhered to the cover; and a display control step of controlling the image information to be input to the light modulating unit to cause the projection display unit to display an outline of a region, in a display area in which the image is displayable by the projection display unit, in which the image light is blocked due to the object adhesion region.

A non-transitory computer readable recording medium storing a control program for a projection display device according to the present invention is a control program for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; and a cover that covers the opening portion, the control program causing a computer to execute a process including: a region detecting step of detecting an object adhesion region in which an object is adhered to the cover; and a display control step of controlling the image information to be input to the light modulating unit to cause the projection display unit to display an outline of a region, in a display area in which the image is displayable by the projection display unit, in which the image light is blocked due to the object adhesion region.

According to the present invention, it is possible to provide a projection display device, a control method for a projection display device, and a non-transitory computer readable recording medium storing a control program for a projection display device with which a region in which information is missing can be visualized to facilitate cleaning.

DESCRIPTION OF THE PREFERRED EMBODIMENTS

Hereinafter, an embodiment of the present invention will be described with reference to the drawings.

Figure 1:
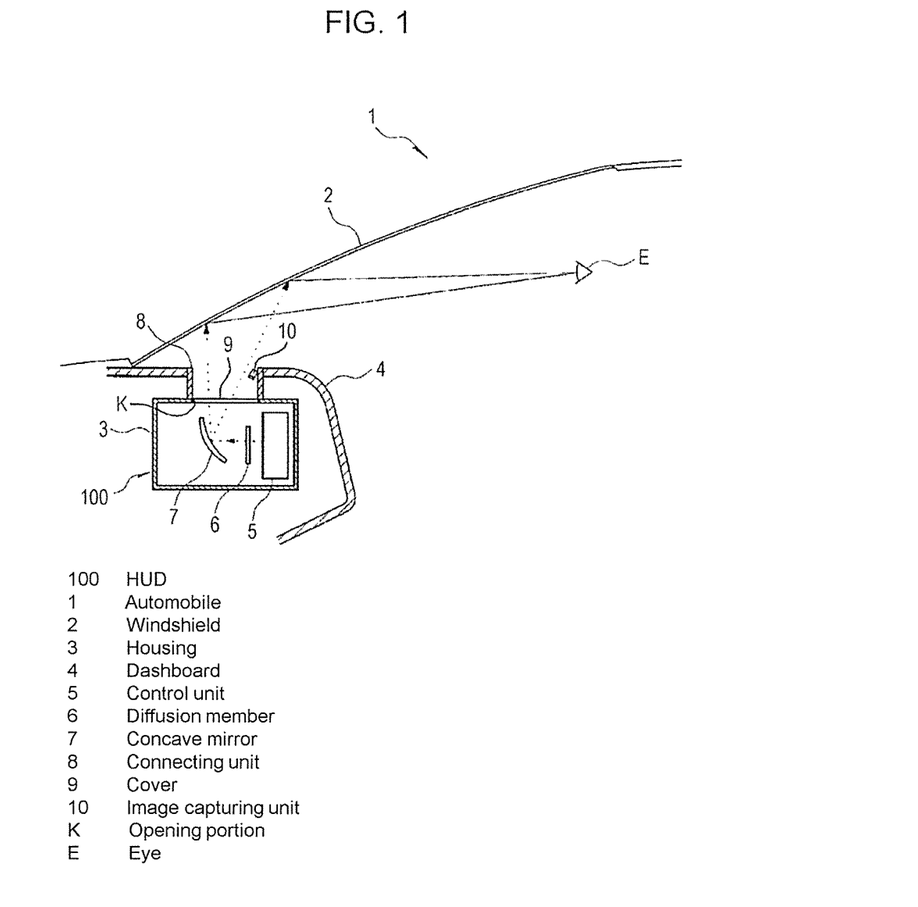
FIG. 1 is a diagram illustrating an overall configuration of an HUD 100, which is an embodiment of a projection display device of the present invention.

FIG. 1 is a diagram illustrating an overall configuration of an HUD 100, which is an embodiment of a projection display device of the present invention.

The HUD 100 is mounted in an automobile 1, uses a partial area of a windshield 2 of the automobile 1 as a projection surface, and makes a virtual image or a real image visible to the driver of the automobile 1 with image light projected onto the projection surface.

The HUD 100 can be mounted and used in a vehicle other than an automobile, such as a train, a heavy machine, a construction machine, an aircraft, a ship, or an agricultural machine.

The HUD 100 is built in a dashboard 4 of the automobile 1 such that part thereof is exposed. The dashboard 4 is a member in which interior components including measuring instruments, such as a speedometer, a tachometer, a fuel gauge, a water-temperature gauge, or an odometer, of the automobile 1 for indicating information necessary for traveling are integrated.

The HUD 100 includes a housing 3, a connecting unit 8, and an image capturing unit 10. The housing 3 has a box form and accommodates a control unit 5, a diffusion member 6, and a concave mirror 7. The control unit 5 includes a light source and a light modulating unit that spatially modulates light emitted from the light source on the basis of image information. The diffusion member 6 and the concave mirror 7 constitute a projection optical system projecting image light obtained as a result of spatial modulation by the light modulating unit onto the windshield 2. The connecting unit 8 has a tubular form and connects the housing 3 with an opening portion of the dashboard 4. The configuration of the projection optical system is an example and is not limited to that illustrated in FIG. 1.

In the housing 3, an opening portion K is formed, and the periphery of the opening portion K of the housing 3 is connected with the opening portion of the dashboard 4 via the connecting unit 8.

The diffusion member 6 is a member that diffuses image light obtained as a result of spatial modulation by the light modulating unit of the control unit 5 so as to become a surface light source. As the diffusion member 6, a micromirror array having a microstructure on a surface thereof, a diffusion mirror, an MLA (microlens array) diffuser, a reflective holographic diffuser, etc. is used.

The concave mirror 7 enlarges image light diffused by the diffusion member 6 and reflects the image light toward the projection surface of the windshield 2. The image light reflected by the concave mirror 7 passes through the opening portion K of the housing 3 and a hollow portion of the connecting unit 8 and is projected toward the projection surface of the windshield 2.

The windshield 2 is processed so that image light passing through the opening portion K and the hollow portion of the connecting unit 8 and projected is reflected in the direction of an eye E of the driver, and the image light is reflected by the windshield 2 and incident on the eye E of the driver. Accordingly, the driver can view an image (virtual image or real image) based on the image light.

The opening portion K of the housing 3 is covered by a cover 9 made of resin, glass etc. that can transmit image light. The opening portion K is an exit window that allows image light reflected by the concave mirror 7 to exit from the housing 3, and the cover 9 is used to prevent dust, liquids, etc. from entering the housing 3 through the opening portion K.

The image capturing unit 10 includes an imaging device and an image processing unit that processes a captured image signal obtained by the imaging device performing image capturing and generates captured image data. The image capturing unit 10 is fixed to the internal wall of the connecting unit 8 at a position above the cover 9 and is disposed so that an image of the front surface of the cover 9 (the surface opposite the inside of the housing 3) can be captured. The captured image data obtained by the image capturing unit 10 performing image capturing is transferred to a system control unit 47 described below of the control unit 5.

The HUD 100 employs the method in which image light is projected onto the windshield 2; however, the HUD 100 may employ a method in which image light is projected onto a combiner (not illustrated) disposed near the windshield 2. In this case, the combiner constitutes the projection surface.

Figure 2:
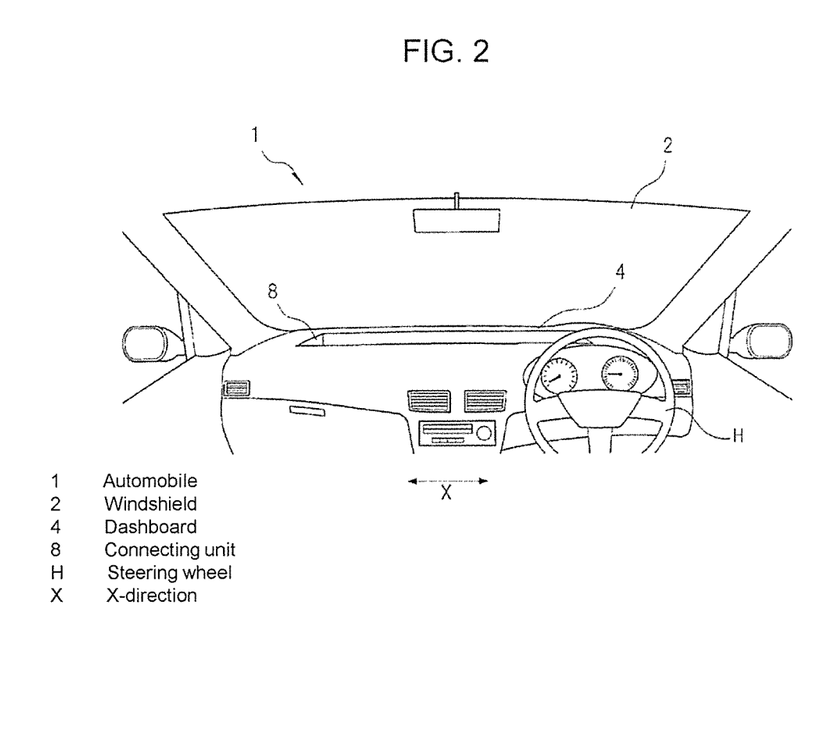
FIG. 2 is a diagram illustrating an external view of a connecting unit 8 illustrated in FIG. 1.

FIG. 2 is a diagram illustrating an external view of the connecting unit 8 illustrated in FIG. 1.

As illustrated in FIG. 2, the hollow portion of the connecting unit 8 is a substantially rectangular parallelepiped portion, and the planar shape of the cover 9 that is located at the base end of the connecting unit 8 when viewed in the direction in which image light exits is a rectangular shape in which the longitudinal direction corresponds to a direction X in which the driver's seat and the passenger seat of the automobile 1 are disposed side by side. Accordingly, the cover 9 has a shape that is long in the direction X, and therefore, images can be displayed in a wide area of the windshield 2.

The automobile 1 is configured such that the driver's seat is disposed at a position facing a steering wheel H illustrated in FIG. 2 and the passenger seat is disposed to the left or to the right (in the example, to the left) of the driver's seat. The direction X in which the driver's seat and the passenger seat of the automobile 1 are disposed side by side is equivalent to a direction substantially orthogonal to the direction of movement of the automobile 1 in a case where the automobile 1 moves straight. The state where two directions are substantially orthogonal to each other is a state where the angle made by the two directions is within a range from 70 degrees to 110 degrees.

Figure 3:
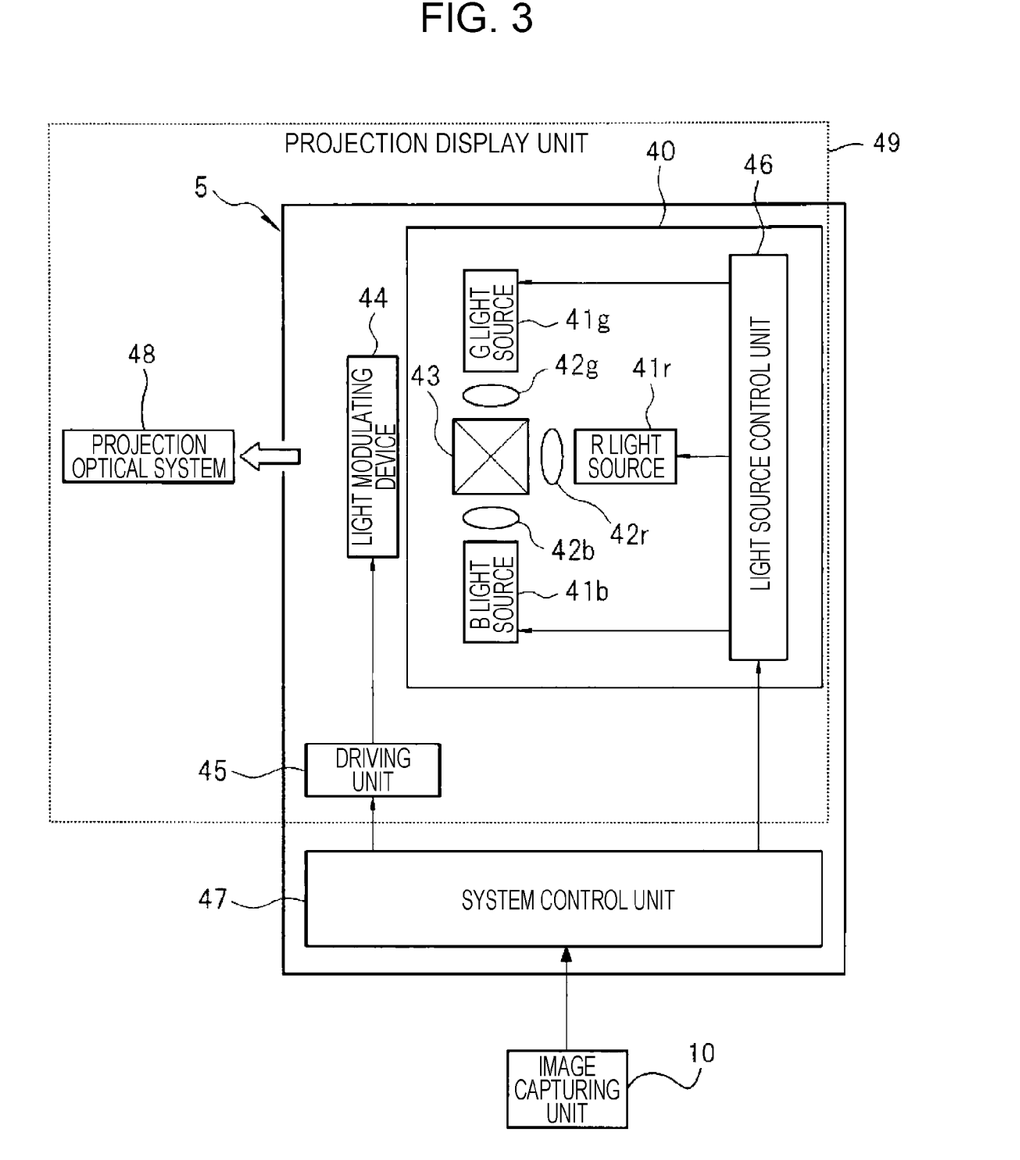
FIG. 3 is a schematic diagram illustrating an example internal configuration of a control unit 5 accommodated in a housing 3 of the HUD 100 illustrated in FIG. 1.

FIG. 3 is a schematic diagram illustrating an example internal configuration of the control unit 5 accommodated in the housing 3 of the HUD 100 illustrated in FIG. 1.

As illustrated in FIG. 3, the control unit 5 of the HUD 100 includes a light source unit 40, a light modulating device 44, a driving unit 45 that drives the light modulating device 44, and the system control unit 47 that controls the HUD 100 as a whole. FIG. 3 illustrates a projection optical system 48, which is constituted by the diffusion member 6 and the concave mirror 7 illustrated in FIG. 1.

The system control unit 47 includes a processor, a ROM (read-only memory) in which programs, etc. executed by the processor are stored, and a RAM (random access memory) that functions as a work memory of the processor. The programs stored in the ROM include a control program for the HUD 100.

The light source unit 40 includes a light source control unit 46, an R light source 41*r* that is a red light source emitting red light, a G light source 41*g* that is a green light source emitting green light, a B light source 41*b* that is a blue light source emitting blue light, a dichroic prism 43, a collimator lens 42*r* that is provided between the R light source 41*r* and the dichroic prism 43, a collimator lens 42*g* that is provided between the G light source 41*g* and the dichroic prism 43, and a collimator lens 42*b* that is provided between the B light source 41*b* and the dichroic prism 43. The R light source 41*r*, the G light source 41*g*, and the B light source 41*b* constitute the light source of the HUD 100.

The dichroic prism 43 is an optical member for guiding rays of light emitted from the R light source 41*r*, the G light source 41*g*, and the B light source 41*b* to the same optical path. The dichroic prism 43 transmits red light collimated by the collimator lens 42*r* and allows the red light to exit therefrom toward the light modulating device 44. The dichroic prism 43 reflects green light collimated by the collimator lens 42*g* and allows the green light to exit therefrom toward the light modulating device 44. The dichroic prism 43 reflects blue light collimated by the collimator lens 42*b* and allows the blue light to exit therefrom toward the light modulating device 44. The optical member having such a function is not limited to a dichroic prism and, for example, a cross dichroic mirror may be used.

As the R light source 41*r*, the G light source 41*g*, and the B light source 41*b*, light emitting devices, such as lasers or LEDs (light emitting diodes), are used. The light source of the HUD 100 need not be constituted by three light sources, namely, the R light source 41*r*, the G light source 41*g*, and the B light source 41*b*, in the example and may be constituted by one light source, two light sources, or four or more light sources.

The light source control unit 46 controls each of the R light source 41*r*, the G light source 41*g*, and the B light source 41*b* to cause the R light source 41*r*, the G light source 41*g*, and the B light source 41*b* to emit rays of light.

The light modulating device 44 spatially modulates rays of light emitted from the R light source 41*r*, the G light source 41*g*, and the B light source 41*b* and exiting from the dichroic prism 43 on the basis of image information input from the system control unit 47.

As the light modulating device 44, for example, LCOS (liquid crystal on silicon), a DMD (digital micromirror device), a MEMS (micro-electro-mechanical systems) device, or a liquid crystal display device can be used.

The driving unit 45 drives the light modulating device 44 on the basis of image information input from the system control unit 47 and causes image light (red image light, blue image light, and green image light) obtained as a result of spatial modulation based on the image information to exit from the light modulating device 44 toward the diffusion member 6 of the projection optical system 48. The light modulating device 44 and the driving unit 45 constitute the light modulating unit of the HUD 100.

The projection optical system 48 constituted by the diffusion member 6 and the concave mirror 7 illustrated in FIG. 1 is optically designed so that an image based on image light projected onto the windshield 2 is visible to the driver as a virtual image at a position ahead of the windshield 2. The projection optical system 48 may be optically designed so that the image based on image light is visible to the driver as a real image on the windshield 2.

The system control unit 47 controls the light source control unit 46 and the driving unit 45 to cause image light obtained as a result of spatial modulation based on image information to exit toward the diffusion member 6.

The projection optical system 48, the light modulating unit constituted by the light modulating device 44 and the driving unit 45, and the light source unit 40 constitute a projection display unit 49.

Figure 4:
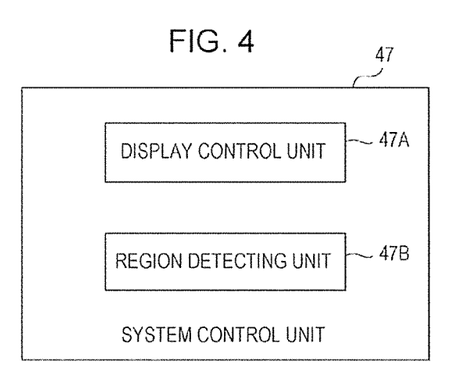
FIG. 4 is a functional block diagram of a system control unit 47 illustrated in FIG. 3.

FIG. 4 is a functional block diagram of the system control unit 47 illustrated in FIG. 3.

The system control unit 47 includes a display control unit 47A and a region detecting unit 47B. The display control unit 47A and the region detecting unit 47B are functional blocks implemented by the processor of the system control unit 47 executing the programs including the control program stored in the ROM.

In a case where an inspection mode is set, the region detecting unit 47B analyzes captured image data input from the image capturing unit 10 and detects a region (hereinafter referred to as an object adhesion region) in which an object is adhered to the front surface of the cover 9. The object includes waste, dust, liquids, sebum, etc. spreading to an extent that may affect the display quality of the HUD 100. The inspection mode is a mode in which it is determined whether dirt that may affect display is present on the front surface of the cover 9 to urge the user to perform cleaning in a case where dirt is present.

For example, reference captured image data obtained by the image capturing unit 10 capturing an image of the front surface of the cover 9 in a clean state where an object is not adhered at all is stored in advance in the ROM of the system control unit 47, and the region detecting unit 47B compares the reference captured image data with captured image data input from the image capturing unit 10 to detect an object adhesion region.

Specifically, the region detecting unit 47B compares the reference captured image data with captured image data input from the image capturing unit 10 and detects change regions, in the captured image data input from the image capturing unit 10, in which the tone changes to a large degree relative to the reference captured image data. The region detecting unit 47B detects a change region, among the change regions, having an area equal to or larger than a threshold as an object adhesion region.

Even in a case where only change regions having an area smaller than the threshold are present, if a plurality of such change regions are present close to each other, the region detecting unit 47B may detect a region that includes the plurality of change regions as an object adhesion region.

The display control unit 47A controls image information to be input to the driving unit 45 to control images to be displayed by the projection display unit 49.

In the case where the inspection mode is set, the display control unit 47A inputs to the driving unit 45 image information including outline information for displaying the outline of a region in which display is not possible because image light is blocked due to an object adhesion region detected by the region detecting unit 47B, and causes the projection display unit 49 to display an image based on the outline information.

In a case where a normal mode is set, the display control unit 47A inputs to the driving unit 45 image information including driving assistance information, such as navigation information for navigation to a destination, information about the travel speed of the automobile 1, information indicating the states of the measuring instruments of the automobile 1, or information for providing warning to the driver of the automobile 1, and causes the projection display unit 49 to display an image based on the driving assistance information.

Figure 5:
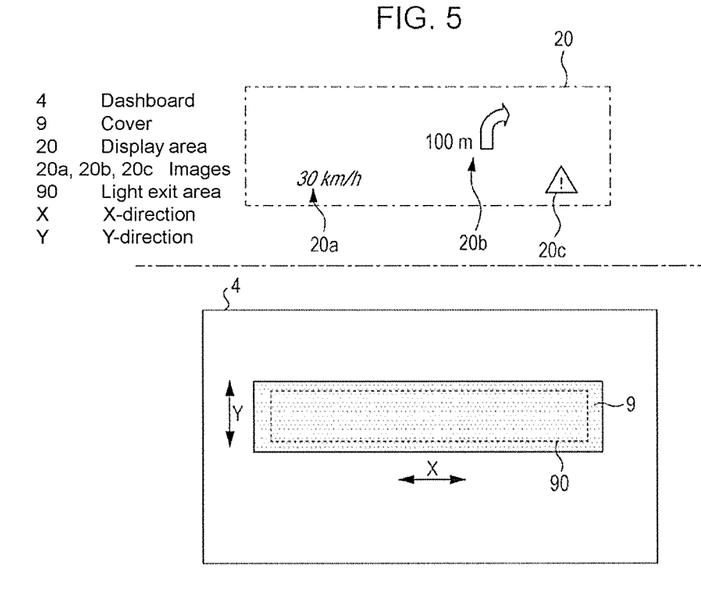
FIG. 5 is a schematic diagram illustrating example images displayed in a normal mode of the HUD 100.

FIG. 5 is a schematic diagram illustrating example images displayed in the normal mode of the HUD 100. In the upper part of FIG. 5, images 20a, 20b, and 20c visible to the driver who sits on the driver's seat of the automobile 1 and a display area 20 that indicates the maximum area in which images can be displayed by the projection display unit 49 are illustrated. In the lower part of FIG. 5, a plan view of the cover 9 when viewed in a direction perpendicular to both the direction X and a direction Y orthogonal to the direction X is shown.

The image 20a includes text that indicates the travel speed of the automobile 1. The image 20b includes text and an arrow for navigation. The image 20c includes an icon for warning.

On the front surface of the cover 9, a light exit area 90 that is an area through which image light passing through the projection optical system 48 exits is present. When image light exiting through the light exit area 90 is projected onto the windshield 2, the image 20a, the image 20b, and the image 20c are displayed in the display area 20. Note that, in the display area 20, a region other than the regions of the images (the image 20a, the image 20b, and the image 20c) based on driving assistance information is transparent to allow checking of the scene ahead of the windshield 2.

Figure 6:
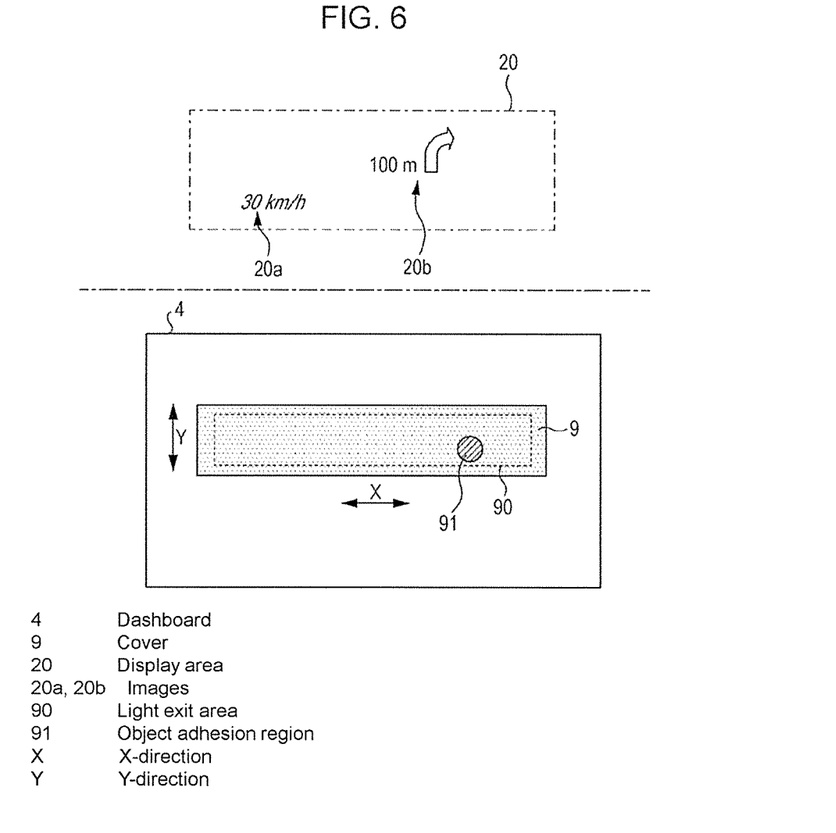
FIG. 6 is a schematic diagram illustrating example images displayed in the normal mode of the HUD 100 and illustrates a state where an object is adhered to the front surface of a cover 9 in the state illustrated in FIG. 5 and an object adhesion region 91 comes into existence.

FIG. 6 is a schematic diagram illustrating example images displayed in the normal mode of the HUD 100 and illustrates a state where an object is adhered to the front surface of the cover 9 in the state illustrated in FIG. 5 and an object adhesion region 91 comes into existence.

In the state illustrated in FIG. 6, image light for displaying the image 20c illustrated in FIG. 5 is blocked due to the object adhesion region 91 in the light exit area 90, and a region in which the image 20c is to be displayed becomes transparent. Therefore, the driver is unable to be aware of warning.

To prevent such a situation, the object adhered to the cover 9 needs to be removed. However, in the display area 20, the region in which image light is blocked (display is not possible) due to the object adhesion region 91 is transparently displayed. Therefore, it is difficult for the driver to determine the location of a dirty portion of the cover 9 only by viewing an image displayed by the HUD 100. Accordingly, the HUD 100 provides the inspection mode described above in order to let the driver intuitively know the location of a portion of the cover 9 to be cleaned.

Figure 7:
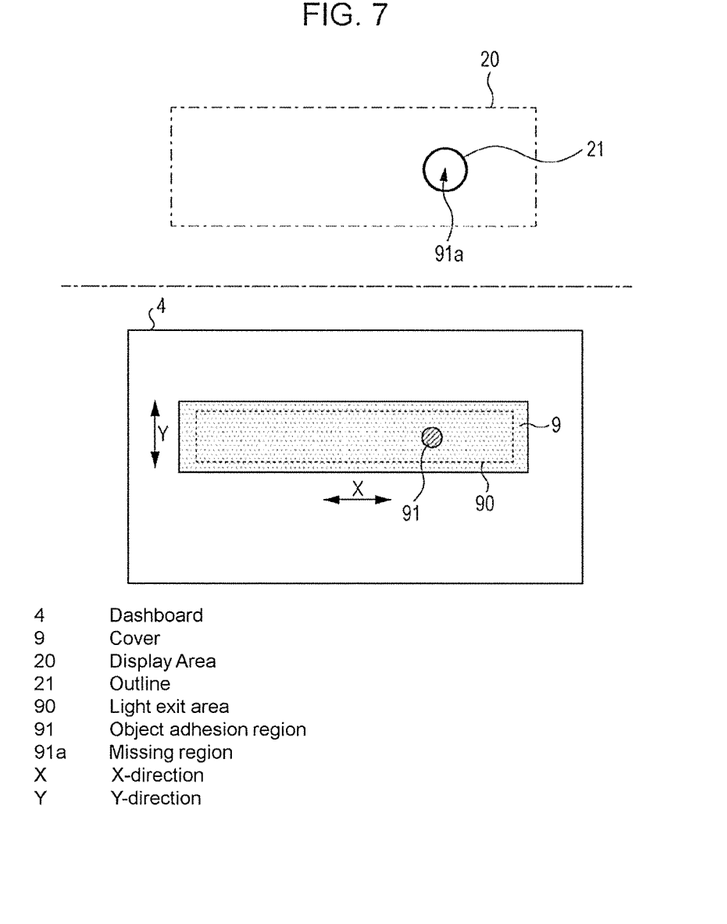
FIG. 7 is a schematic diagram illustrating an example image displayed in an inspection mode of the HUD 100.

FIG. 7 is a schematic diagram illustrating an example image displayed in the inspection mode of the HUD 100. In the upper part of FIG. 7, the display area 20 described above is illustrated. In the lower part of FIG. 7, a plan view of the cover 9 when viewed in a direction perpendicular to both the direction X and the direction Y orthogonal to the direction X is shown.

As illustrated in FIG. 7, in the inspection mode, when the object adhesion region 91 is detected by the region detecting unit 47B in the light exit area 90, the display control unit 47A generates and inputs to the driving unit 45 image information including outline information for coloring and displaying the outline of a region, in the display area 20, in which image light is blocked due to the object adhesion region 91.

Accordingly, as illustrated in the upper part of FIG. 7, in the display area 20, an outline 21 of a missing region 91a in which display is not possible due to the object adhesion region 91 is displayed. Note that a portion other than the outline 21 in the display area 20 is transparently displayed.

When the driver knows in advance the approximate location of the display area 20 on the windshield 2, the driver can know the approximate location of a dirty portion of the cover 9 with the outline 21. Therefore, the driver can efficiently clean the front surface of the cover 9.

Note that, when the object adhesion region 91 is detected by the region detecting unit 47B in the light exit area 90, the display control unit 47A may generate and input to the driving unit 45 image information for coloring and displaying a frame that represents the perimeter of the display area 20 and the outline of a region, in the display area 20, in which image light is blocked due to the object adhesion region 91.

Figure 8:
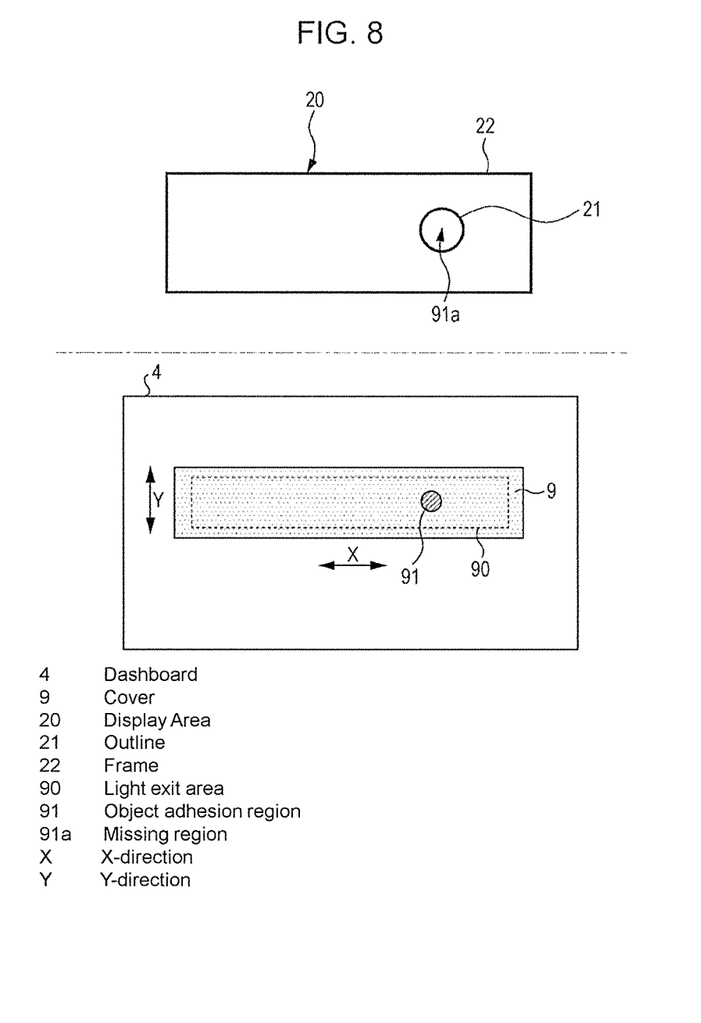
FIG. 8 is a schematic diagram illustrating another example image displayed in the inspection mode of the HUD 100.

Accordingly, as illustrated in the upper part of FIG. 8, the outline 21 around the missing region 91a in which display is not possible due to the object adhesion region 91 and a frame 22 that represents the perimeter of the display area 20 are displayed in the display area 20. Note that a portion other than the outline 21 and the frame 22 is transparently displayed in the display area 20.

With this configuration, the driver can know the positional relation between the light exit area 90 and the object adhesion region 91 on the cover 9 and can more intuitively know the approximate location of a dirty portion of the cover 9.

Figure 9:
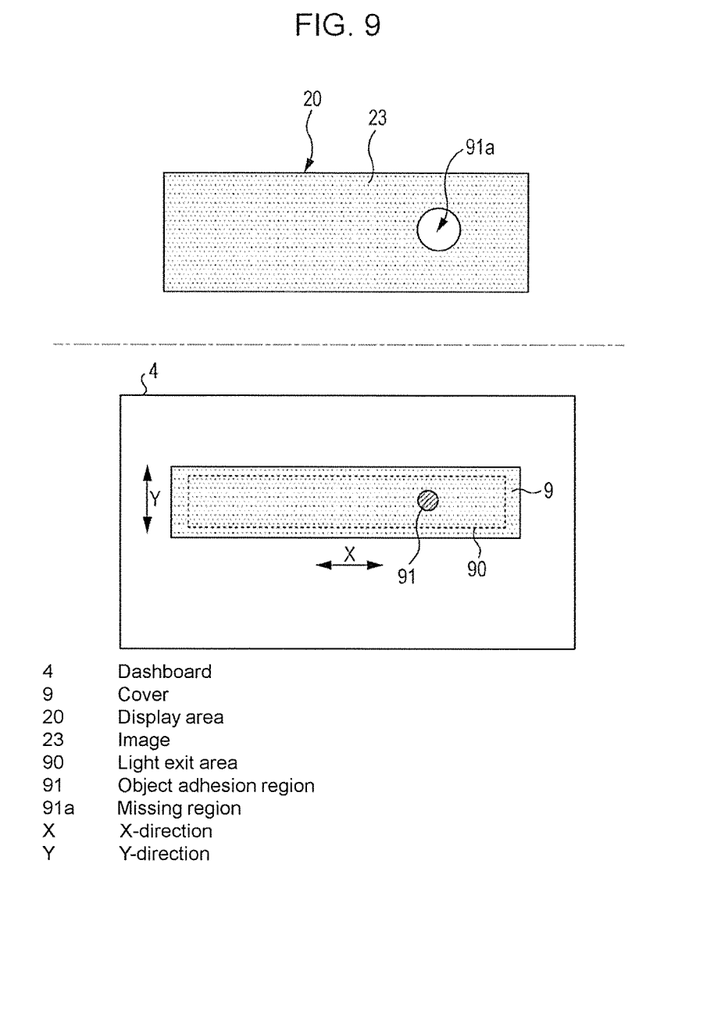
FIG. 9 is a schematic diagram illustrating yet another example image displayed in the inspection mode of the HUD 100.

When the object adhesion region 91 is detected by the region detecting unit 47B in the light exit area 90, the display control unit 47A may generate and input to the driving unit 45 image information for coloring (for example, with one color, such as red or blue) and displaying a portion other than a region, in the display area 20, in which image light is blocked due to the object adhesion region 91.

Accordingly, as illustrated in the upper part of FIG. 9, in the display area 20, an image 23 in a single color is displayed in a portion other than the missing region 91a in which display is not possible due to the object adhesion region 91.

With this configuration, the background image ahead of the windshield 2 becomes less visible due to the image 23, and therefore, the visibility of the outline of the region in which display is not possible due to the object adhesion region 91 can be increased.

Now, operations of the HUD 100 are described.

Figure 10:
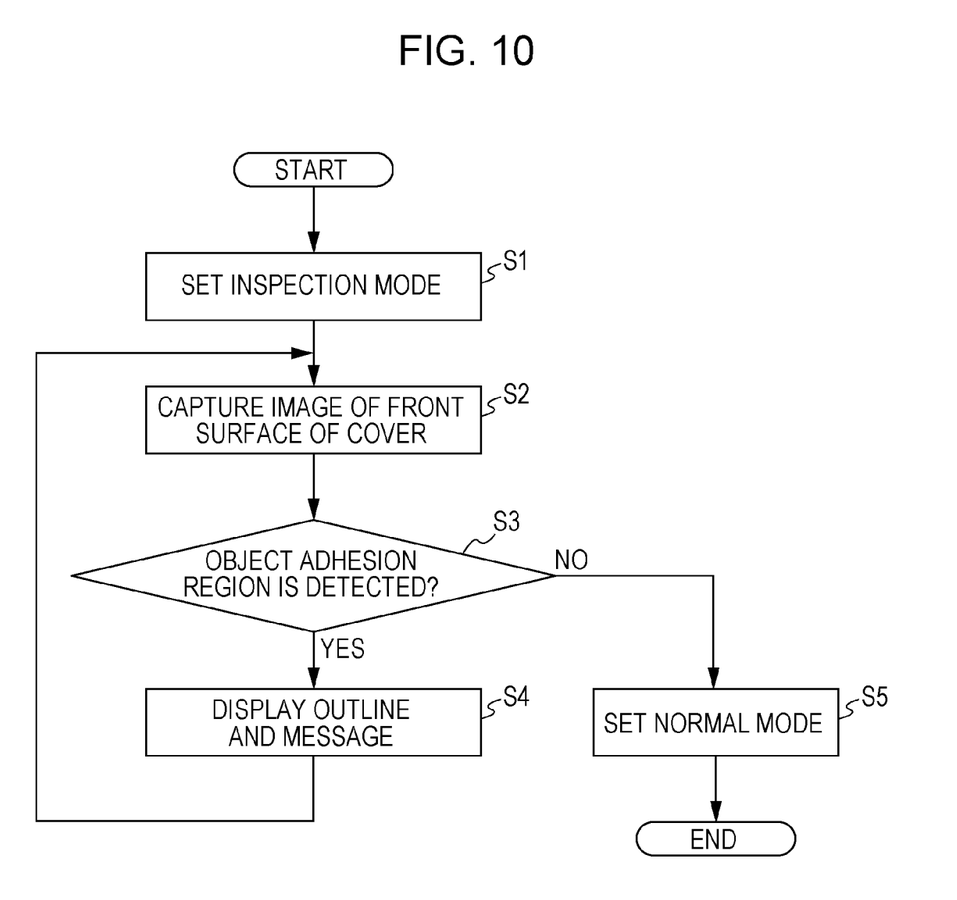
FIG. 10 is a flowchart for describing operations of the HUD 100 illustrated in FIG. 1.

FIG. 10 is a flowchart for describing operations of the HUD 100 illustrated in FIG. 1.

When the power of the HUD 100 is turned on and the HUD 100 is activated in response to the ignition key of the automobile 1 being operated, the system control unit 47 sets the operation mode to the inspection mode (step S1).

When the inspection mode is set, an image of the front surface of the cover 9 is captured by the image capturing unit 10 (step S2), and captured image data is input to the system control unit 47. When the captured image data is input, the region detecting unit 47B of the system control unit 47 detects an object adhesion region on the front surface of the cover 9 on the basis of the captured image data and reference captured image data.

When an object adhesion region is detected (step S3: YES), the display control unit 47A generates image information for displaying the outline of a region in which display is not possible due to the object adhesion region and a message for urging the user to clean the cover 9 and causes the outline and the message to be displayed in the display area 20 (step S4). After step S4, the flow returns to step S2.

For example, the message may be "The cover of the HUD is dirty. Please clean the cover with reference to the displayed image". The message may be delivered to the driver not as an image but as audio output. Note that message display or audio output is not essential.

If an object adhesion region is not detected in step S3, the display control unit 47A sets the operation mode to the normal mode (step S5) and starts displaying an image based on driving assistance information.

As described above, in the HUD 100, in a case where an object is adhered to the cover 9 in the inspection mode, an outline corresponding to a region in which the object is adhered is displayed by the projection display unit 49. Therefore, the driver can intuitively know the approximate location of the dirty portion of the cover 9. Accordingly, the driver needs to clean only a necessary portion of the cover 9 and can efficiently perform cleaning. When the surface area of the cover 9 increases as the screen size of the HUD becomes larger in the future, effort is required to clean the entire front surface. Accordingly, the present technique with which the location of an object adhesion region can be known with a displayed image is effective.

Note that, in the operation example illustrated in FIG. 10, an automatic transition to the inspection mode occurs when the HUD 100 is activated; however, this configuration need not be employed. For example, a transition to the inspection mode may occur at any timing in response to a manual operation.

Further, in the operation example illustrated in FIG. 10, the operation mode automatically transitions to the normal mode at the time point when an object adhesion region is not detected any more; however, the operation mode may transition to the normal mode from the inspection mode in response to a manual operation. In the operation example illustrated in FIG. 10, when a transition from the state where an object adhesion region is present to the state where the front surface of the cover 9 is cleaned and an object adhesion region is not detected any more occurs, the normal mode automatically starts. Therefore, the transition to the normal mode allows the driver to recognize that dirt of the cover 9 has been removed, which can increase convenience.

In the above description, the image capturing unit 10 is provided above the cover 9; however, the image capturing unit 10 may be disposed inside the housing 3 so that an object adhesion region can be detected.

The configuration is employed in which the cover 9 fits in the opening portion K; however, any configuration may be employed as long as the cover 9 covers the opening portion K. For example, a configuration may be employed in which the cover 9 is fixed to an outer surface of the housing 3 and the back surface of the cover 9 covers the entire opening portion K, thereby covering the opening portion K.

As described above, the following matters are disclosed herein.

(1) A projection display device including: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; a region detecting unit that detects an object adhesion region in which an object is adhered to the cover; and a display control unit that controls the image information to be input to the light modulating unit to control the image to be displayed by the projection display unit, in which the display control unit causes the projection display unit to display an outline of a region, in a display area in which the image is displayable by the projection display unit, in which the image light is blocked due to the object adhesion region.

(2) The projection display device according to (1), in which the display control unit causes the projection display unit to display a frame representing a perimeter of the display area together with the outline.

(3) The projection display device according to (1), in which the display control unit causes the projection display unit to display the outline by coloring and displaying a portion other than the region, in the display area, in which the image light is blocked due to the object adhesion region.

(4) The projection display device according to any one of (1) to (3), in which the display control unit causes the outline to be displayed at a timing at which the projection display device is activated.

(5) A control method for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; and a cover that covers the opening portion, the control method including: a region detecting step of detecting an object adhesion region in which an object is adhered to the cover; and a display control step of controlling the image information to be input to the light modulating unit to cause the projection display unit to display an outline of a region, in a display area in which the image is displayable by the projection display unit, in which the image light is blocked due to the object adhesion region.

(6) The control method for a projection display device according to (5), in which in the display control step, the projection display unit is caused to display a frame representing a perimeter of the display area together with the outline.

(7) The control method for a projection display device according to (5), in which in the display control step, the projection display unit is caused to display the outline by coloring and displaying a portion other than the region, in the display area, in which the image light is blocked due to the object adhesion region.

(8) The control method for a projection display device according to any one of (5) to (7), in which in the display control step, the outline is caused to be displayed at a timing at which the projection display device is activated.

(9) A control program for a projection display device having: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; and a cover that covers the opening portion, the control program causing a computer to execute a process including: a region detecting step of detecting an object adhesion region in which an object is adhered to the cover; and a display control step of controlling the image information to be input to the light modulating unit to cause the projection display unit to display an outline of a region, in a display area in which the image is displayable by the projection display unit, in which the image light is blocked due to the object adhesion region.

According to the present invention, a region in which information is missing can be visualized to facilitate cleaning of a cover through which image light exits.

REFERENCE SIGNS LIST

100 HUD
1 automobile
2 windshield
3 housing
4 dashboard
5 control unit
6 diffusion member
7 concave mirror
8 connecting unit
9 cover
10 image capturing unit
20 display area
20a, 20b, 20c image
21 outline
22 frame
23 image
40 light source unit
41r R light source
41g G light source
41b B light source
42r, 42g, 42b collimator lens
43 dichroic prism
44 light modulating device
45 driving unit
46 light source control unit
47 system control unit
47A display control unit
47B region detecting unit
48 projection optical system
49 projection display unit
90 light exit area
91 object adhesion region
91a missing region
H steering wheel
K opening portion
E eye
X, Y direction

What is claimed is:

1. A projection display device comprising:
   a projection display unit that includes a light modulating unit spatially modulating light emitted from a light source on the basis of input image information and projects image light obtained as a result of spatial modulation onto a projection surface of a vehicle to display an image based on the image light;
   a housing that accommodates the projection display unit and has an opening portion through which the image light exits;
   a cover that covers the opening portion;
   an image capturing unit that is disposed at a position above the projection display unit and the cover, and the image capturing unit facing downwards to the cover to capture a front surface image of the cover;
   a region detecting unit that receives the front surface image from the image capturing unit and detects an object adhesion region in which an object is adhered to the cover by analyzing the front surface image; and
   a display control unit that controls the image information to be input to the light modulating unit to control the image to be displayed by the projection display unit, wherein
   the display control unit causes the projection display unit to display an outline of a region, in a display area in which the image is displayable by the projection display unit on the projection surface, in which the image light is blocked due to the object adhesion region, and causes the projection display unit to display a frame representing a perimeter of the display area together with the outline.

2. The projection display device according to claim 1, wherein
   the display control unit causes the projection display unit to display the outline by coloring and displaying a portion other than the region, in the display area, in which the image light is blocked due to the object adhesion region.

3. The projection display device according to claim 1, wherein
the display control unit causes the outline to be displayed at a timing at which the projection display device is activated.

4. The projection display device according to claim 2, wherein
the display control unit causes the outline to be displayed at a timing at which the projection display device is activated.

5. A control method for a projection display device comprising: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an image capturing unit that is disposed at a position above the projection display unit and the cover, and the image capturing unit facing downwards to the cover, the control method comprising:
an image capturing step of controlling the image capturing unit to capture a front surface image of the cover;
a region detecting step of detecting an object adhesion region in which an object is adhered to the cover by analyzing the front surface image captured by the image capturing unit; and
a display control step of controlling the image information to be input to the light modulating unit to cause the projection display unit to display an outline of a region, in a display area in which the image is displayable by the projection display unit on the projection surface, in which the image light is blocked due to the object adhesion region,
wherein in the display control step, the projection display unit is caused to display a frame representing a perimeter of the display area together with the outline.

6. The control method for the projection display device according to claim 5, wherein
in the display control step, the projection display unit is caused to display the outline by coloring and displaying a portion other than the region, in the display area, in which the image light is blocked due to the object adhesion region.

7. The control method for the projection display device according to claim 5, wherein
in the display control step, the outline is caused to be displayed at a timing at which the projection display device is activated.

8. The control method for the projection display device according to claim 6, wherein
in the display control step, the outline is caused to be displayed at a timing at which the projection display device is activated.

9. A non-transitory computer readable recording medium storing a control program for a projection display device comprising: a projection display unit that includes a light modulating unit spatially modulating light emitted from a light source on the basis of input image information and projects image light obtained as a result of spatial modulation onto a projection surface of a vehicle to display an image based on the image light; a housing that accommodates the projection display unit and has an opening portion through which the image light exits; a cover that covers the opening portion; and an image capturing unit that is disposed at a position above the projection display unit and the cover, and the image capturing unit facing downwards to the cover to capture a front surface image of the cover, the control program causing a computer to execute a process comprising:
an image receiving step of receiving the front surface image from the projection display device;
a region detecting step of detecting an object adhesion region in which an object is adhered to the cover by analyzing the front surface image; and
a display control step of controlling the image information to be input to the light modulating unit to cause the projection display unit to display an outline of a region, in a display area in which the image is displayable by the projection display unit on the projection surface, in which the image light is blocked due to the object adhesion region,
wherein in the display control step, the projection display unit is caused to display a frame representing a perimeter of the display area together with the outline.

* * * * *